United States Patent [19]

DiBartolo

[11] Patent Number: 5,381,823
[45] Date of Patent: Jan. 17, 1995

[54] HYDRAULIC PRESSURE CONTROL VALVE

[75] Inventor: Ernest A. DiBartolo, Sarasota, Fla.

[73] Assignee: Sun Hydraulics, Sarasota, Fla.

[21] Appl. No.: 194,937

[22] Filed: Feb. 14, 1994

[51] Int. Cl.⁶ .............................................. F16K 17/06
[52] U.S. Cl. .................................................... 137/494
[58] Field of Search ........................................ 137/494

[56] References Cited

U.S. PATENT DOCUMENTS

| | | | |
|---|---|---|---|
| 3,215,236 | 11/1965 | Pensa | 137/494 X |
| 3,414,006 | 12/1968 | Feroy | 137/494 |
| 4,742,846 | 5/1988 | DiBartolo | 137/514.5 |
| 5,050,636 | 9/1991 | Sagawa | 137/494 |

Primary Examiner—Robert G. Nilson
Attorney, Agent, or Firm—Charles J. Prescott

[57] ABSTRACT

A hydraulic pressure control valve, such as a pilot-operated relief valve and such as a direct-acting differential piston relief valve, having a spring chamber pressurized with fluid from a passage though a movable relief piston. The fluid within the spring chamber may be at the same pressure as that at the inlet valve closing pressure to assist a coil spring acting against the inner face of the relief piston. Inlet pressure in the valve working on an area difference between the faces of the relief piston produces the hydraulic force which is opposed by the spring to open the valve. At its other end, the spring transmits force against a movable biasing piston immediately adjacent a closed end of the spring chamber. The biasing piston provides automatic linearly increasing adjustment of the set pressure in response to inlet pressure acting over a greater net area than that of the relief piston. Inlet pressure fluid flowing into the valve moves the biasing piston toward a stop within the spring chamber to compress the spring and, in doing so, serves to buffer otherwise abrupt pressure spikes as the system is activated. Various types of pressure relief and pressure control valves in hydraulic systems are provided.

11 Claims, 3 Drawing Sheets

HYDRAULIC PRESSURE CONTROL VALVE

BACKGROUND OF THE INVENTION

1. Scope of Invention

This invention relates generally to pressure control valves in hydraulic systems and more particularly to a pressure control/relief valve which eliminates pressure spikes and hydraulic shock in such systems.

2. Prior Art

Relief valves are used to provide a quick opening for excessive hydraulic pressure. They are characterized by a structure in which the regulated hydraulic pressure is applied directly to or through an orifice in a primary or relief piston. The relief piston area in a differential piston area-type relief valve is annular and measured in terms of the difference in areas resulting from the piston seating area and either the piston outside diameter or a defined smaller internal diameter. By this method, a large seating diameter is achieved, providing good flow capacity, and operating forces are reduced to provide high pressure capability in a reasonably small package. The force exerted on the relief piston annular area as a result of the hydraulic pressure tends to move the relief piston away from the source of the pressure, thereby unseating the valve to relieve the pressure. This opening pressure is typically opposed by a spring. Appropriate selection of the spring force and piston areas will provide a relief valve which will theoretically open at a desired pressure and close when the pressure falls below that pressure.

A pilot operated relief valve accomplishes a similar function as above in a hydraulic circuit. However, the inlet pressure causes fluid flow through an orifice in the relief spool or piston once a poppet or check valve is unseated, resulting in a differential pressure across the head of the relief piston or spool which acts to move the relief piston or spool to an open position.

My previous U.S. Pat. No. 4,742,846 discloses a differential piston relief valve which resolves many of the prior art shortcomings of hysteresis and instability due to the Bernoulli effect without sacrificing response time to open and close. However, the present invention, by introducing an additional differential piston, further provides automatic increases in set pressure while also serving to avoid hydraulic pressure spikes and shock.

All conventional relief valves such as the differential piston relief valve and the pilot operated relief valve are part of another shortcoming of conventional high pressure hydraulic control systems. When these hydraulic systems are actuated so as to energize a hydraulic actuator, cylinder or motor in conjunction with, for example, an overhead crane, pressure increases virtually instantaneously. As a result, there is a sharp hydraulic shock and/or spike in the pressurized fluid system which results in excessively abrupt energizing of the hydraulic motor. Not only is this operational limitation abusive to the system, but it may also be operationally detrimental in that the equipment being operated will exhibit too sharp a start-up.

The present invention provides a hydraulic buffer in that the biasing piston within the hydraulic pressure control valve will be displaced against a coil spring within the spring chamber of the valve producing linear, progressive change in spring force as hydraulic pressure increases to operating pressure. By this arrangement, hydraulic pressure rise rate is not only decreased from virtually instantaneously, but also reduces or eliminates any spike or overshoot in the system pressure.

BRIEF SUMMARY OF THE INVENTION

This invention is directed to a hydraulic pressure control valve such as a pilot-operated relief valve and a direct-acting differential piston relief valve which has a spring chamber pressurized with fluid from a passage through a movable relief piston. The fluid within the spring chamber may be at or below system pressure to assist a coil spring acting against one face of the relief piston. Inlet pressure in the valve working on an area difference between the faces of the relief piston produces the hydraulic force which is opposed by the spring to open the valve. At its other end, the spring transmits force against a movable biasing piston immediately adjacent a closed end of the spring chamber. The biasing piston provides automatic linearly increasing adjustment of the set pressure in response to inlet pressure acting, for example, over a greater net area than that of the relief piston. Inlet pressure fluid flowing into the valve moves the biasing piston toward a stop within the spring chamber to compress the spring and, in doing so, serves to buffer otherwise abrupt pressure spikes and shock as the system is activated. Various embodiments of pressure relief and pressure control valves in hydraulic systems are provided.

It is therefore an object of this invention to provide a hydraulic pressure control valve which also serves as a system pressure buffer to eliminate hydraulic pressure spikes and shock and to decrease the pressure rise rate upon system start-up.

It is yet another object of this invention to provide a direct-acting differential piston relief valve which includes a biasing piston for linearly increasing spring force acting against the relief piston in proportion to inlet pressure.

It is yet another object of this invention to provide a pilot operated relief valve which prevents hydraulic shock in response to virtually otherwise instantaneous system pressure rises.

It is yet another object of this invention to provide a relief valve embodying the hydraulic shock and spike elimination feature and which remains a two-port valve in the preferred embodiment.

In accordance with these and other objects which will become apparent hereinafter, the instant invention will now be described with reference to the accompanying drawings.

DETAILED DESCRIPTION OF THE INVENTION

The details of my previous U.S. Pat. No. 4,742,846 are incorporated herein by reference as many of the features of the relief piston structure described herebelow are similar thereto.

Figure 1:
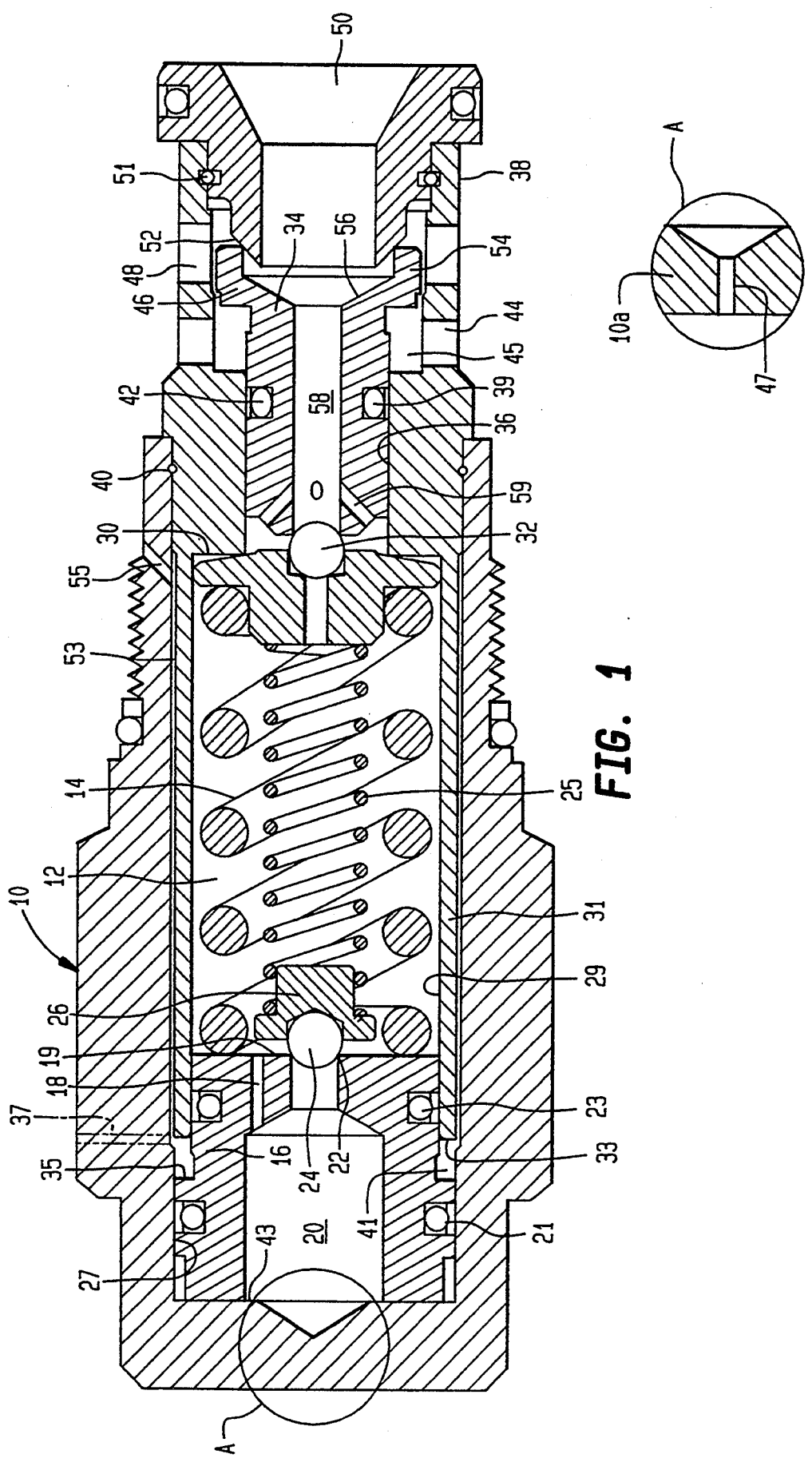
FIG. 1 depicts a direct-acting differential piston relief valve of this invention in cross section, FIG. 1A being an alternate form thereof.

Referring to the drawings, and particularly to FIG. 1, body 10 has an axially extending spring chamber 12 with main spring 14 contained therein. Recess 22 in the center of the face 19 of a biasing piston 16 centrally locates check ball 24 secured in spring guide 26. Check ball 24 is used, inter alia, to provide a spherical surface on spring guide 26 although other means for providing this surface may be used. Spring guide 30 with ball 32 at the other end of spring 14 has the same structure.

Although it may not be apparent from a cursory glance at the drawing, balls 24 and 32 provide the only mechanical means for transmitting the spring force of spring 14 to biasing piston 16 and relief piston 34. This is important in the present invention which achieves much of its efficacy from the low friction of the moving parts. If the spring force exerted on pistons 16 and 34 is not completely axially oriented, i.e. if it contains sidewise force components, then pistons 16 and 34 will tend to bind in their respective piston cylinders 27/29 and 36 or have higher frictional forces opposing movement. A spring does not deliver a completely axially directed force and the use of the ball-containing spring guides tends to eliminate sidewise force components.

This same friction reduction construction is employed in seals 21, 23 and 39 which include an inner O-ring and an outer ring seal of low friction material such as Teflon. A suitable ring seal is identified as Glyd Ring available from Shambam Corporation. It should also be noted that this structure provides a bi-directional seal, sealing both with pressure drop from chamber 12 to annular chambers 41 and 45 and the reverse, when back pressure is applied to the valve. These seals may alternatively be positioned on the corresponding cylinder wall. An alternate way of providing a two-way seal would be having an O-ring with a backup or sacrificial seal on each side but this would increase friction and consume considerably more axial space. Also, the surface area of seal 39 in friction contact with the corresponding cylinder is reduced by designing piston 34 to have a small diameter.

Piston cylinder 36 is a part of body extension 38 which is secured to body 10 by wire 40 in this embodiment, although other means of securing these parts together may also be used. Piston cylinder 36 has an annular groove containing seals 42. Seals 42 include the customary O-ring, backed-up on each side, or other bi-directional high pressure sealing means can be used. Body extension 38 includes radial ports 44 which communicate with cavity 45 located behind piston head 46. Ports 44 insure that no hydraulic pressure in cavity 45 will resist the opening movement of piston head 46, nor will any vacuum retard its closing movement. Ports 48 in body extension 38 are the primary exhaust ports of the valve.

Valve inlet 50, having a valve seat 52 at its inner end, is secured to body extension 38 by threads in the embodiment actually built; however, other means for joining these parts may also be used such as an annular wire 51. Valve seat 52 is lapped to provide a conical surface (it could be spherical or of any configuration to provide sealing means with piston head 46) and cooperates with the face of piston head 46 to open or close the passage from the inlet to outlet ports 48. The relief piston face 56 has two parts; annular extension 54 and concave conical face 56. The inner circumference of annular extension 54 provides the seal with seat 52. It has been found that the structure of previous valves in which fluid flows past the piston face in its path to the outlet ports tends to result in valve closing forces due to Bernoulli effects. These forces cause valve chatter and are essentially eliminated with the design of the present invention because fluid flows initially through the gap between the spherical surface of seat 52 and the corner or inner circumference of annular extension 54 which has no piston face area upon which the flow can produce closing force.

It will be noted that passage 58 through piston 46 will admit the pressurized fluid at inlet 50 to pressurize spring chamber 12. Unrestricted flow into and out of spring chamber 12 is achieved by passages 59 between passage 58 and spring chamber 12. Pressurizing spring chamber 12 provides hydraulic pressure, acting on a specific piston area, which assists spring 14 in resisting opening pressure and provides damping which also reduces valve chatter. The instability problem experienced with differential relief valves having the spring chamber at downstream pressure do not occur in the valve of the present invention. Pure relieving pressure forces only work on specific areas on each side of the piston. The piston is not influenced by flow forces, which result from velocity and turbulence, and which are vague and not predictable.

The high pressure within spring chamber 12 also compresses any air therein to an extremely low volume and, in the presence of continuing pressure, into solution. Moreover, it will be noted from FIG. 1 that piston areas on each side of the relief piston 34 and biasing piston 16, respectively, which are exposed to the inlet pressure are different only to the extent that differential area is produced. Up to 90% of total piston face areas (both sides) are exposed to the pressure which is being relieved. Conventional valves typically have less than 15% exposed to pressure, the reminder to fluctuating downstream pressure. The resulting system embodied by this invention is stiff and inherently stable.

Destabilizing conditions exist in fluid power circuits which can dictate the need for viscous damping. In such a situation, the preferred embodiment permits pressurized viscous damping through control of the number and diameter of passages 59 or, the diameter of passage 58. Viscous damping is preferred to friction damping because it has no effect upon hysteresis and reseat or upon valve accuracy. Pressure damping is preferred to low or return pressure damping because it is predictable and consistently effective. Using the pressurized fluid for damping also permits a larger orifice size, therefore not impairing the valves ability to respond quickly.

In operation, when the set pressure is reached, relief piston 34 will be moved back into spring chamber 12. This movement is accompanied by the displacement of fluid at inlet pressure from spring chamber 12 and through passages 59 and 58, permitting smooth but rapid opening of the inlet port. As inlet pressure decreases, spring 14 will move relief piston 34 outwardly with only minimum resistance against this movement contributed by the low friction seal 39. Testing has shown the pressure with decreasing flow (valve closing) to be within 5% of the pressure with increasing flow, a measure of hysteresis.

In my previous U.S. Pat. No. '846, internal set pressure was manually adjusted by a threaded spring chamber closure acting against a ball and a spring guide to vary the length of spring 14. However, this invention represents an improvement over that structure by introducing the biasing piston 16. This biasing piston 16 includes a larger diameter sealably acting against piston cylinder 27 and a smaller diameter sealably acting against piston cylinder 29. Piston cylinder 27 is positioned immediately adjacent the sealed end 43 of chamber 12, which sealed end 43 is integral with body 10. Smaller piston cylinder 29 is positioned immediately adjacent the larger piston cylinder 27 and is preferably defined by a sleeve 31 of body extension 38. This sleeve 31 extends around the main spring 14 through chamber 12 to terminate at distal stop surface 33. By this arrangement, biasing piston 16 moves between the closed end 43 of body 10 and stop surface 33 which interengages and abuts against surface The net area of biasing piston 16 is established to be greater than that of the relief piston 34 as previously described. As a result, biasing piston 16 has the capability of linearly increasing the spring force exerted by main spring 14 against relief piston 34, and this plays a part in establishing both operating pressure and the maximum relieving pressure.

Orifice 18 controls the rate of flow of inlet pressurized fluid into chamber 20, which inlet pressure acting upon the differential area between piston cylinders 27 and 29 will urge biasing piston 16 to compress main spring 14 as inlet pressure increases. As biasing piston 16 moves to compress main spring 14 in this manner, the system pressure increases even further. When the set pressure exceeds the system pressure, which set pressure is automatically increased by the movement of biasing piston 16 against main spring 14, relieving action stops.

The maximum set pressure is controlled by biasing piston 16 being moved by fluid pressure against stop surface 33. The minimum set pressure of this differential valve is established when biasing piston 16 is against closed end surface 43.

The speed of movement of biasing piston 16 is established by appropriate size selection of orifice 18. To facilitate the rapid reset of this valve, check ball 24, acting upon recess 22, allows fluid within chamber 20 and between biasing piston 16 and end surface 43 to rapidly flow back into chamber 12 when relief piston 16 is moved toward closed end surface 43. A check valve coil spring 25 acting between spring guides 30 and establishes the force required to unseat check ball 24 in this fashion.

Sleeve 31 may be sized so as to provide a cylindrical gap or passage 53 with respect to the surface of chamber 12, which gap 53 is in fluid communication with port 55, port 55 opening to outlet or return fluid pressure. Alternately, a vented port 37 shown in phantom serves to insure that no hydraulic pressure or vacuum in cavity 41 will resist the free movement of biasing piston 16, in this case, port 55 is omitted.

A very important operational feature of the present invention in all embodiments is the ability to prevent hydraulic system pressure spikes and sharp, virtually instantaneous, pressure rises or shock when the hydraulic system into which the invention is incorporated is activated. Hydraulic pressure pumps which provide the hydraulic pressure for such systems, in conjunction with quick response directional valves, have the ability to apply system pressure almost virtually instantaneously. This instantaneous pressure rise, however, may be deleterious to motors and associated equipment which are actuated by this hydraulic pressure. By providing the biasing piston 16 which is acted upon directly by inlet pressure as above described, a small volume of hydraulic fluid at system or inlet pressure flows into the valve to displace the biasing piston 16 against main spring 14 in proportion to system pressure as it rises. Thus, fluid flow into the valve through inlet 50 continues by the movement of biasing piston 16 against main spring 14 until the hydraulic system reaches its maximum operating pressure or until surface 35 abuts against the distal end of sleeve 31 as previously described, whichever occurs first.

By allowing pressurized system fluid to flow into the relief valve of FIG. 1 in this fashion, not only are pressure spikes above system pressure eliminated, but the time required for the rise in system pressure is increased to about 5 to 10 milliseconds, depending upon the size of orifice 18, an amount of time ample to eliminate system shock.

OPERATING CYCLE

A typical operating cycle is as follows:

The relief valve is idle, that is, it is not exposed to high pressure fluid at its inlet port and it is not relieving. Since no significant pressure exists at its inlet port, the valve's control spring is relaxed to a minimum force. This force need only be high enough to provide sufficient inlet pressure to initiate biasing piston movement against the spring. When the circuit which the relief valve is protecting is activated, flow is directed to the actuator (a hydraulic cylinder or motor) which, in turn, is called upon to move a load. Since the relief valve pressure setting is low, there is initial flow to the valve's outlet port, but the presence of pressure at the inlet port causes the biasing piston to move to compress the spring. Relieving flow will continue through the valve until the valve's pressure setting is greater than the pressure to move the load. At this point, flow through the relief valve stops and all flow goes to move the actuator. In this manner, hydraulic shock is eliminated. Shock results, typically, from rapid, uncontrolled pressure rise in a circuit.

Figure 2:
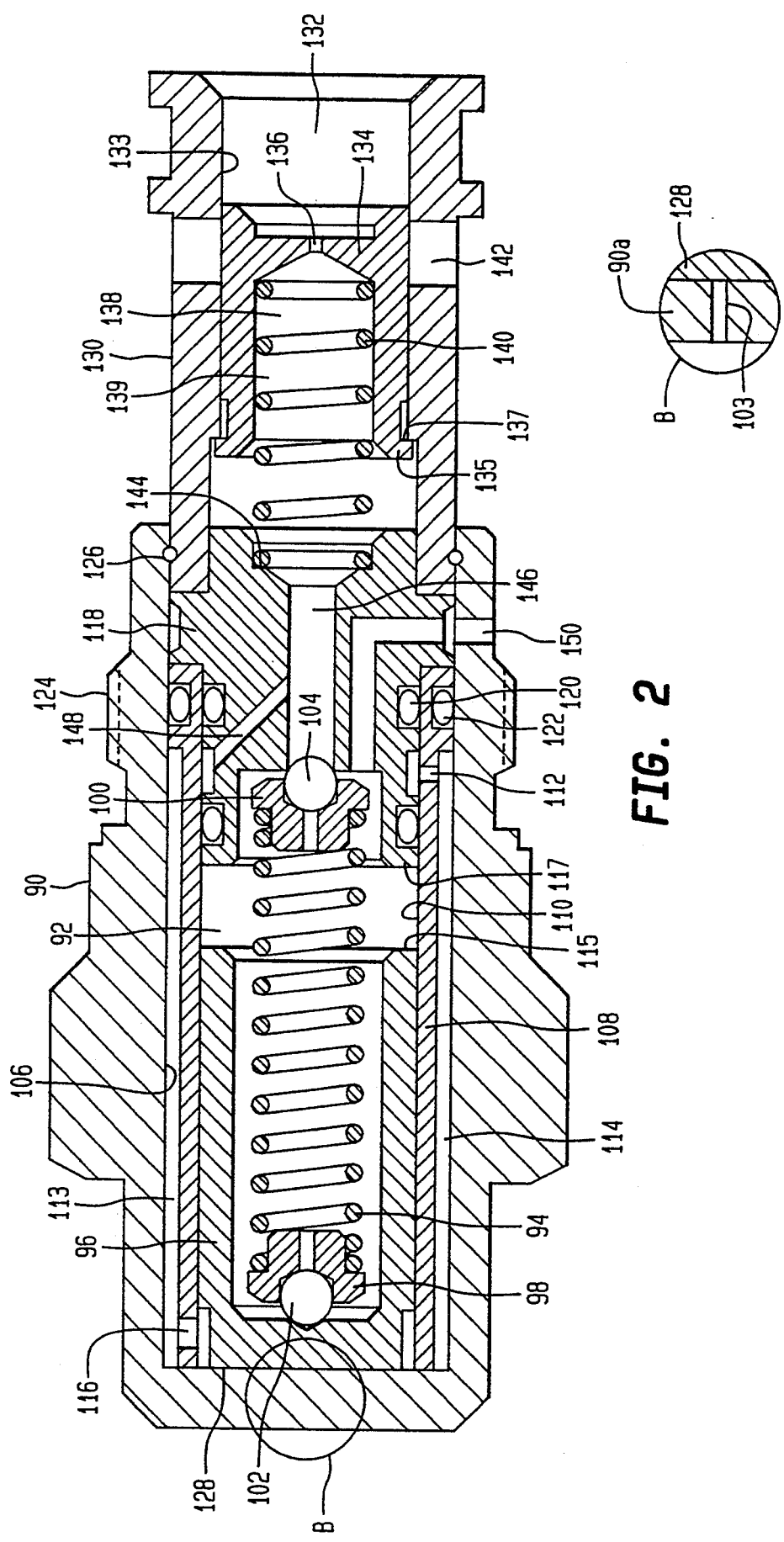
FIG. 2 depicts a pilot-operated relief valve of this invention in cross section FIG. 2A being a alternate form thereof.

Referring now to FIG. 2, a pilot operated relief valve is there shown having a body 90 with an axially extending spring chamber 92 and main spring 94 contained therein. Each end of the main spring 94 is supported by spring guides 98 and 100, each of which includes a spherical ball 102 and 104, respectively to provide the only mechanical means for transmitting the spring force of main spring 94 to a biasing piston 96 and a check poppet passageway 146 longitudinally through member 118.

This embodiment of the invention discloses a spring chamber 92 which is referenced to outlet pressure, rather than the inlet pressure as previously described with respect to FIG. 1. To accomplish this, a biasing piston 96 is slidably, sealably supported within spring chamber 92 and within a piston cylinder 110 defined by cylindrical sleeve 108. This cylindrical sleeve is sealed within bore 106 by seal 122 and held from longitudinal movement by member 118. Member 118 is sealed by seals 120 within piston cylinder 110. The distal end of sleeve 108 abuts against the closed end 128 of body 90.

This pilot operated relief valve also includes a body extension 130 which, at one end, defines a valve inlet port 132. Body extension 130 also defines a longitudinal cylinder 133 within which a pilot operated relief spool or poppet 134 is sealably, slidably mounted. The relief spool 134 includes a centrally located orifice 136 which extends from one face of the relief spool 134 which faces valve inlet port 132 into a spring chamber 139. Within spring chamber 139, a coil spring 140 acts between spring seat 144 and relief spool 134 so as to urge the relief spool 134 into a closed position wherein flange 135 abuts against shoulder 137 to define a closed position of the relief spool 134.

Ports 142 in body extension 130 serve as the primary exhaust ports of this valve and are sealed from fluid communication with the valve inlet port 132 when the relief spool 134 is in its closed position shown.

Inlet pressure is transmitted through control orifice 136 into spring chamber 138 as the system pressure into which this valve is located increases. When inlet pressure is sufficiently high to move poppet ball 104 against spring 94, the poppet ball 104 is unseated and fluid flow occurs into spring chamber 92 and into an outlet port via radial passage 150 in body 90. As this relieving flow occurs, a pressure drop occurs across orifice 136 resulting in a net force sufficient to overcome spring 140, whereupon relief spool 134 moves to uncover outlets 142 and to open the valve.

As the system is pressurized, fluid at inlet pressure also flows into passageway 148 and through orifice 112 and into cylindrical cavity 113 defined by the outer surface of sleeve 108 and ball 106. Thus, the biasing piston 96 senses inlet pressure on one of its faces at 128 via port 116 and a lower outlet pressure within spring chamber 92. As inlet pressure increases, the biasing piston will move to compress spring 94 until the system pressure reaches a pre-determined level wherein end surface 115 abuts against surface 117, which establishes the maximum relieving pressure of this valve by exerting a maximum spring pressure against poppet ball 104.

The speed with which biasing piston 96 moves to compress spring 94 is controlled by the size of orifice 112, which in turn, determines the efficacy of this structure for eliminating hydraulic shock.

From the above description of the valve shown in FIGS. 1 and 2, it should be clear that the present invention includes hydraulic pressure control and hydraulic pressure relief valves which include main spring chambers which operate at both inlet and outlet or atmospheric pressure, depending on the response characteristics and operating environment into which the valve is to be utilized. The key structural benefit of all such valves under this invention includes a movable biasing piston which is driven by inlet pressure fluid against either inlet pressure acting over a differential area or lower outlet pressure to compress the main relieving spring of the valve as the system is pressurized. By allowing system fluid at operating pressure to flow into the valve at a controlled rate at start-up and out during system stoppage, movement of this biasing piston results in the elimination of system shock and hydraulic pressure spikes which would otherwise occur. During this movement of the biasing piston as a result of pressurized fluid flow into the valve, the spring force exerted to establishing the relieving pressure is linearly progressively increased to a maximum. Thus, the valve starts relieving at a predetermined low pressure and rises to a maximum at a rate which is controlled by orifice size.

Figure 3:
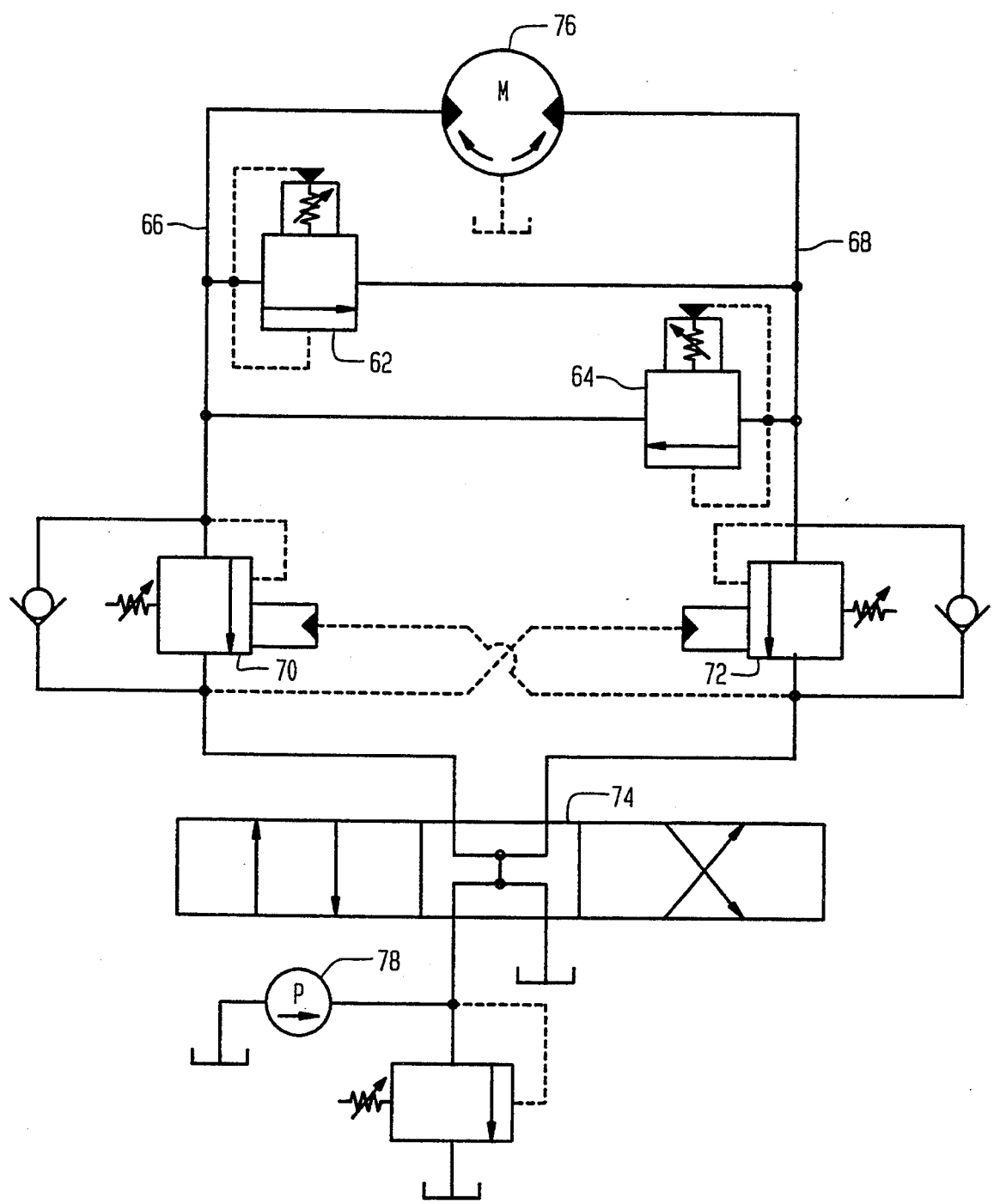
FIG. 3 is a block diagram of a circuit in which the relief valve of FIGS. 1 or 2 may be used.

Referring now to FIG. 3, direct-acting, differential relief valves 62 and 64 are symbolically shown in a crossover or dual relief configuration. Hydraulic lines 66 and 68 may alternately be the high and low pressure lines, such as where an actuator 76 has one side connected to each line. As the actuator 76 moves, displacing fluid from one side, the high pressure port of the relief valve connected to that line, say line 66, opens with excess pressure and exhausts fluid to the other line, 68 in this example. This relieves the pressure and, when the actuator 76 displaces equal volumes in each direction, it prevents cavitation in the system. When a direction control valve 74 is shifted to start rotation of actuator 76, load acceleration is smooth and gradual because some of the system hydraulic fluid pressurized by pump 78 is shunted to the low pressure side of the circuit. Deceleration is also smooth and gradual when the direction control valve 74 is centered. A counterbalance valve 70/72 closes and the load is decelerated by flow over the relief valve to the low pressure side of the circuit. It is important in such an application that each valve have the capability to resist high pressures in the reverse direction, i.e. from the outlet ports to the inlet port because the same pressure being applied at the inlet port of one valve is applied to the outlet port of the other valve. In the valves of the present invention, it is evident from inspection of the drawings that any net force from the outlet port will tend to close the valve and have no detrimental effect upon the valve parts exposed to this closing pressure, making these valves suitable for this purpose.

ALTERNATE FORM

Although the invention with respect to FIGS. 1 and 2 as above described is the preferred embodiment, i.e., structure which is directed to a two-part valve, an alternate of the invention in general terms is described hereinbelow. Most installations of such hydraulic pressure control valves preferably utilize a self-contained assembly as that above described. These preferred embodiments disclose structure which conveys hydraulic fluid at inlet pressure by internal passages to between the closed end of the body and the biasing piston.

However, to simplify the internal structure of these valves, where a separate eternal hydraulic fluid line is acceptable, a third port shown at 47 in FIG. 1A and 103 in FIG. 2A, formed through the end of the body 10a and 90a, respectively, may be provided. Each of these orifices 47 and 103 are connectable to a separate pressure line conveying inlet pressure thereto. In conjunction with the addition of orifice 47 and 103, orifice 18 through the biasing piston 16 in FIG. 1, and orifice 112 formed through sleeve 108, respectively, would both be eliminated. Additionally, the piston cylinders 29 in FIG. 1 and 110 in FIG. 2 would then be most conveniently formed integrally with body 10a and 90a, respectively.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A differential piston relief valve comprising:
   a body having a longitudinally extending bore therein;
   said bore having first and second ends, said first end being closed and first and second piston cylinders adjacent one another, said first piston cylinder being larger in diameter than said second piston cylinder to define a first net area, said first piston cylinder being positioned adjacent said closed first end;

a biasing piston slidably supported in said bore for movement between said first end of said bore and a stop means in said bore;

said biasing piston having a first outside diameter forming an interface with said first piston cylinder and a second outside diameter forming an interface with said second piston cylinder;

a body extension secured to said body at said second end of said bore;

a valve seat secured to said body extension;

said valve seat defining a valve inlet port;

a radially extending passage through said body extension adjacent to said valve seat defining a valve outlet port;

a spring chamber in said body defined by said bore, said first end of said bore and said body extension;

said body extension having a longitudinal bore therethrough forming a third piston cylinder;

a relief piston slidably supported in said third piston cylinder forming an interface therewith;

said relief piston having a head extending radially outwardly from said relief piston, whereby said relief piston has a smaller outside diameter than said piston head to define a second net area;

said piston head having a longitudinally extending annular extension thereon;

an inner edge on said piston head annular extension;

said inner edge forming a seal with said valve seat when said inner edge abuts said valve seat;

a spring guide in said spring chamber abutting said relief piston;

a coil spring axially supported in said spring chamber for transmitting spring force against spring guide and said biasing piston, whereby said spring tends to close said valve;

a passage extending through said relief piston between said spring chamber and said inlet port;

said biasing piston having an orifice therethrough extending from said spring chamber to said first end of said bore, said first net area being greater than said second net area, whereby said differential piston moves toward said stop means as inlet pressure increases.

2. A differential piston relief valve in accordance with claim 1, wherein said stop means includes:
a thin wall tubular portion of said body extension, said tubular portion extending along said bore and surrounding said spring; and
a distal end of said tubular portion terminating against an outer abutment of said biasing piston when said biasing piston is positioned from said closed end of said bore at a maximum operating pressure of said valve.

3. A differential piston relief valve in accordance with claim 1, wherein:
said body extension also having a sleeve portion extending through said spring chamber around said spring to define said second piston cylinder, a distal end of said sleeve defining said stop means.

4. A hydraulic pressure control valve comprising:
a body having a longitudinally extending bore therein;
said bore defining a first piston cylinder and having first and second ends, said first end being closed;
a biasing piston slidably supported in said bore for movement between said first end of said bore and a stop means in said bore;
said biasing piston having an outside diameter forming a sealed interface with said first piston cylinder;
a body extension secured to said body at said bore second end and defining a valve inlet port;
a radially extending passage through said body extension defining a valve outlet port;
a spring chamber in said body defined by said bore, said bore first end and said body extension;
said body extension having a longitudinal bore therethrough forming a second piston cylinder;
a relief piston slidably supported in said second piston cylinder forming a sealed interface therewith;
spring means within said body bore for transmitting spring force against said biasing piston and said relief piston, whereby said spring means tends to close said valve and to urge said biasing piston toward said first end of said bore;
a passage extending through said relief piston from said inlet port and into an orifice whereby inlet hydraulic pressure flows between said first end of said bore and said biasing piston to move said biasing piston toward said stop means as inlet pressure increases;
said stop means including:
a thin wall tubular portion of said body extension, said tubular portion extending along said bore and surrounding said spring means; and
a distal end of said tubular portion terminating against an outer abutment of said first piston when said first piston is positioned from said closed end of said bore at a maximum operating pressure of said valve.

5. A hydraulic pressure control valve comprising:
a body having a longitudinally extending bore therein;
said bore defining a first piston cylinder and having first and second ends, said first end being closed;
a biasing piston slidably supported in said bore for movement between said first end of said bore and a stop means in said bore;
said biasing piston having an outside diameter forming a sealed interface with said first piston cylinder;
a body extension secured to said body at said bore second end and defining a valve inlet port;
a radially extending passage through said body extension defining a valve outlet port;
a spring chamber in said body defined by said bore, said bore first end and said body extension;
said body extension having a longitudinal bore therethrough forming a second piston cylinder;
a relief piston slidably supported in said second piston cylinder forming a sealed interface therewith;
spring means within said body bore for transmitting spring force against said biasing piston and said relief piston, whereby said spring means tends to close said valve and to urge said biasing piston toward said first end of said bore;
a passage extending through said relief piston from said inlet port and into an orifice whereby inlet hydraulic pressure flows between said first end of said bore and said biasing piston to move said biasing piston toward said stop means as inlet pressure increases;
said body extension also including a sleeve extension extending through said spring chamber around said spring means to define said bore, a distal end of said sleeve defining said stop means.

6. A hydraulic pressure control valve comprising:

a body having a longitudinally extending bore therein;

said bore defining a first piston cylinder and having first and second ends, said first end being closed;

a biasing piston slidably supported in said bore for movement between said first end of said bore and a stop means in said bore;

said biasing piston having an outside diameter forming a sealed interface with said first piston cylinder;

a body extension secured to said body at said bore second end and defining a valve inlet port;

a radially extending passage through said body extension defining a valve outlet port;

a spring chamber in said body defined by said bore, said bore first end and said body extension;

said body extension having a longitudinal bore therethrough forming a second piston cylinder;

a relief piston slidably supported in said second piston cylinder forming a sealed interface therewith;

spring means within said body bore for transmitting spring force against said biasing piston and said relief piston, whereby said spring means tends to close said valve and to urge said biasing piston toward said first end of said bore;

a passage extending through said relief piston from said inlet port and into an orifice whereby inlet hydraulic pressure flows between said first end of said bore and said biasing piston to move said biasing piston toward said stop means as inlet pressure increases;

a radially extended vent port in said body whereby fluid between said biasing piston and said stop means is readily expelled as inlet pressure increases.

7. A hydraulic pressure relief valve comprising:

a body means defining a longitudinally extending first piston cylinder, said body means having a closed first end thereof;

a biasing piston means;

a stop means in said body means;

said biasing piston means slidably, sealably supported in said first piston cylinder for movement between said closed first end and said stop means;

a body extension means secured to a second end of said body means and defining a valve inlet port and a second piston cylinder;

a radially extending passage means through said body extension means defining a valve outlet;

a relief piston means slidably sealably supported in said second piston cylinder for movement between a closed position wherein said valve outlet is closed by said relief piston means and an open position wherein said valve outlet is open and in fluid communication with said valve inlet;

spring means for urging said biasing piston toward said first closed end and for urging said relief piston toward the closed position;

fluid passage means for conveying pressurized fluid at said inlet port to between said closed first end and said biasing piston means whereby said biasing piston means is moved toward said stop means as inlet pressure increases;

said stop means including:
  a thin wall tubular portion of said body extension means, said tubular portion extending along said bore and surrounding said spring means; and
  a distal end of said tubular portion terminating against an outer abutment of said biasing piston means when said biasing piston means is positioned from said first closed end at a maximum operating pressure of said valve.

8. A hydraulic pressure relief valve comprising:

a body means defining a longitudinally extending first piston cylinder, said body means having a closed first end thereof;

a biasing piston means;

a stop means in said body means;

said biasing piston means slidably, sealably supported in said first piston cylinder for movement between said closed first end and said stop means;

a body extension means secured to a second end of said body means and defining a valve inlet port and a second piston cylinder;

a radially extending passage means through said body extension means defining a valve outlet;

a relief piston means slidably sealably supported in said second piston cylinder for movement between a closed position wherein said valve outlet is closed by said relief piston means and an open position wherein said valve outlet is open and in fluid communication with said valve inlet;

spring means for urging said biasing piston toward said first closed end and for urging said relief piston toward the closed position;

fluid passage means for conveying pressurized fluid at said inlet port to between said closed first end and said biasing piston means whereby said biasing piston means is moved toward said stop means as inlet pressure increases;

said body extension means also including a sleeve extension to define said first piston cylinder, a distal end of said sleeve defining said stop means.

9. A hydraulic pressure relief valve in accordance with claim 8, wherein:

said fluid passage means is formed through said relief piston means and said relief piston means.

10. A hydraulic pressure relief valve in accordance with claim 8, wherein:

said fluid passage means is formed through said closed first end and being connectable to hydraulic fluid at inlet pressure.

11. A hydraulic pressure relief valve comprising:

a body means defining a longitudinally extending first piston cylinder, said body means having a closed first end thereof;

a biasing piston means;

a stop means in said body means;

said biasing piston means slidably, sealably supported in said first piston cylinder for movement between said closed first end and said stop means;

a body extension means secured to a second end of said body means and defining a valve inlet port and a second piston cylinder;

a radially extending passage means through said body extension means defining a valve outlet;

a relief piston means slidably sealably supported in said second piston cylinder for movement between a closed position wherein said valve outlet is closed by said relief piston means and an open position wherein said valve outlet is open and in fluid communication with said valve inlet;

spring means for urging said biasing piston toward said first closed end and for urging said relief piston toward the closed position;

fluid passage means for conveying pressurized fluid at said inlet port to between said closed first end and said biasing piston means whereby said biasing piston means is moved toward said stop means as inlet pressure increases;

a radially extended vent port in said body whereby fluid between said biasing piston and said stop means is readily expelled as said valve is pressurized.

* * * * *